(12) United States Patent
Rivalier et al.

(10) Patent No.: US 7,138,095 B2
(45) Date of Patent: Nov. 21, 2006

(54) LIQUID—LIQUID BATTERY MOUNTED EXTRACTORS

(75) Inventors: Patrick Rivalier, Mauguio (FR); Florent Gandi, Saint-Andre d'Olerargues (FR); Gilles Ferlay, Laudun (FR)

(73) Assignee: Commissariat a l'Energie Atomique, Paris (FR)

( * ) Notice: Subject to any disclaimer, the term of this patent is extended or adjusted under 35 U.S.C. 154(b) by 207 days.

(21) Appl. No.: 10/491,176

(22) PCT Filed: Oct. 18, 2002

(86) PCT No.: PCT/FR02/03581

§ 371 (c)(1),
(2), (4) Date: Mar. 30, 2004

(87) PCT Pub. No.: WO03/035209

PCT Pub. Date: May 1, 2003

(65) Prior Publication Data

US 2004/0241062 A1    Dec. 2, 2004

(30) Foreign Application Priority Data

Oct. 22, 2001    (FR)    .................................. 01 13595

(51) Int. Cl.
*B01D 11/04*    (2006.01)
(52) U.S. Cl. .................. 422/256; 238/151; 414/790.3; 422/258

(58) Field of Classification Search .................. 422/65, 422/256, 258; 414/790.3; 256/65.01; 104/15; 238/151

See application file for complete search history.

(56) References Cited

U.S. PATENT DOCUMENTS

| | | | | |
|---|---|---|---|---|
| 3,658,245 A | * | 4/1972 | Nelson | ........................ 238/151 |
| 3,952,948 A | * | 4/1976 | Nelson et al. | ............... 238/243 |
| 5,254,244 A | | 10/1993 | Chomel | |
| 5,267,936 A | | 12/1993 | Miachon | |
| 5,383,689 A | | 1/1995 | Wolfe, Sr. | |
| 5,755,980 A | * | 5/1998 | Semel et al. | ................. 210/638 |

\* cited by examiner

*Primary Examiner*—Krisanne Jastrzab
(74) *Attorney, Agent, or Firm*—Pearne & Gordon LLP (57) ABSTRACT

This liquid—liquid extractor essentially comprises: individual extractors (1), battery mounted, sliding or set along rails (2) and able to consist of separators of two liquid phases by centrifuging; intermediate parts (3) connecting the individual extractors (1) to allow the flows to cross them successively and to undergo increasingly improved separation of their species, or to proceed with overflows or withdrawals, these parts being simply set on the rails so as to be able to replaced easily; and a tightening system (6, 7) comprising either a stop means (6) at one end of the rails (2) and a push means (7) at the opposite end, or two push means (7) at each end, to tighten the battery and to ensure a sealed connection between the intermediate parts (3) and the individual extractors (1).

11 Claims, 10 Drawing Sheets

LIQUID—LIQUID BATTERY MOUNTED EXTRACTORS

The present invention relates to a battery of liquid-liquid extractors.

The extractors concerned here are centrifugal extractors, compartmentalised liquid-liquid extractors comprising two parts: 1) a mixer where the two phases are stirred to enable the transfer of one or several extractable solutes from one phase to the other; 2) a decanter where the separation of phases occurs under the effect of the centrifugal force. These apparatuses are generally associated in several stage batteries with counter-current circulation of the two phases in order to achieve the intended extraction level. In general a complete liquid-liquid extraction method comprises different phases of extraction, de-extraction, and washing requiring addition or withdrawal of fluids in the battery. Such a battery of centrifugal extractors is mentioned in an article in "Nuclear Sciences and Techniques", volume 9, no. 3, August 1998, pages 157 to 162 and entitled "Recent advances of annular centrifugal extractor for hot test of nuclear waste partitioning process": the individual extractors are introduced into alveoli in a common support and linked together by ducts. Unfortunately, an assembly like this is not very adaptable, especially when taking into account the fact that it is inside a shielded cell when dangerous objects have to be treated and thus cannot be reached except by remote control manipulators with limited handling possibilities.

The aim of the invention is to correct the defects of this battery type and to propose a battery comprising a number, even a high number, of individual extractors mounted in series, while still retaining the possibility of modifying the system simply, to change the number of extractors or the particular specifications of the method.

In its most general form, the invention thus relates to equipment for liquid-liquid extraction from a mixture of two liquid phases, comprising a battery of individual extractors aligned and connected together, and a common support for the individual extractors, characterised in that the support consists of rails, the individual extractors comprising a sliding base or a base set and locked on the rails, the individual extractors being connected together by intermediate parts comprising bases set on the rails with a lateral position adjustment relative to the rails and sliding on the rails, and also a tightening system for the battery of individual extractors and intermediate parts included in the extraction equipment.

The individual extractors, similar to each other, are thus interchangeable and are added or removed along the rails. Because the rails usually cross the sliding extractor base, or include a locking system such as a lock pin, for extractors set upon them, they maintain them against lateral and vertical movements so well that the battery is made very rigid. In general, the intermediate parts acting as linkage between the individual extractors comprise ducts allowing continuous flow of each liquid phase to be established, but they can also comprise, if necessary, vents which, by balancing the pressures between the stages, ensure good circulation of the phases and through which additives can be introduced into the mixture or the purge or extraction ducts. Various types of intermediate parts can thus be shown to be useful, and they can also be changed as needed to modify the extraction process. This is easy because the intermediate parts are simply set on the rails: it suffices to separate the adjacent individual extractors a little, to lift the intermediate part and to replace it by the new one before retightening the battery of extractors. Finally, the tightening system makes it possible to install and maintain the cohesion and seal of the battery during the whole extraction process, while still allowing rapid release of the battery to organise it once again.

The battery can include one or two end parts comprising a base set on the rails with a positioning adjustment lateral to the rails, sliding on the rails and connecting an adjacent individual extractor to either a phase input or outlet. This end part is useful above all in methods for counter-current extractions, where the individual extractors are crossed by two intersecting flows; according to a slightly different device, one of the end parts can also carry a stop device for the battery that is part of the tightening system, complementary to means for definitive tightening that is completely separate and set at the other end of the rails. In the case where the two end parts are similar, the tightening system is symmetrical on either side of the rail.

Furthermore, the invention comprises a certain number of original points, which will be better understood by reading the following; some of them facilitate the assembly, the tightening and the arrangement of individual extractors, intermediate parts and the tightening system. An embodiment of the invention is described below, with reference to the following figures:

FIG. 4 bis shows individual extractors set and locked on the rails;

FIGS. 7, 8 (A and B), 9 (A and B), 10 and 11 and 12 show the intermediate and end parts.

Figure 1:
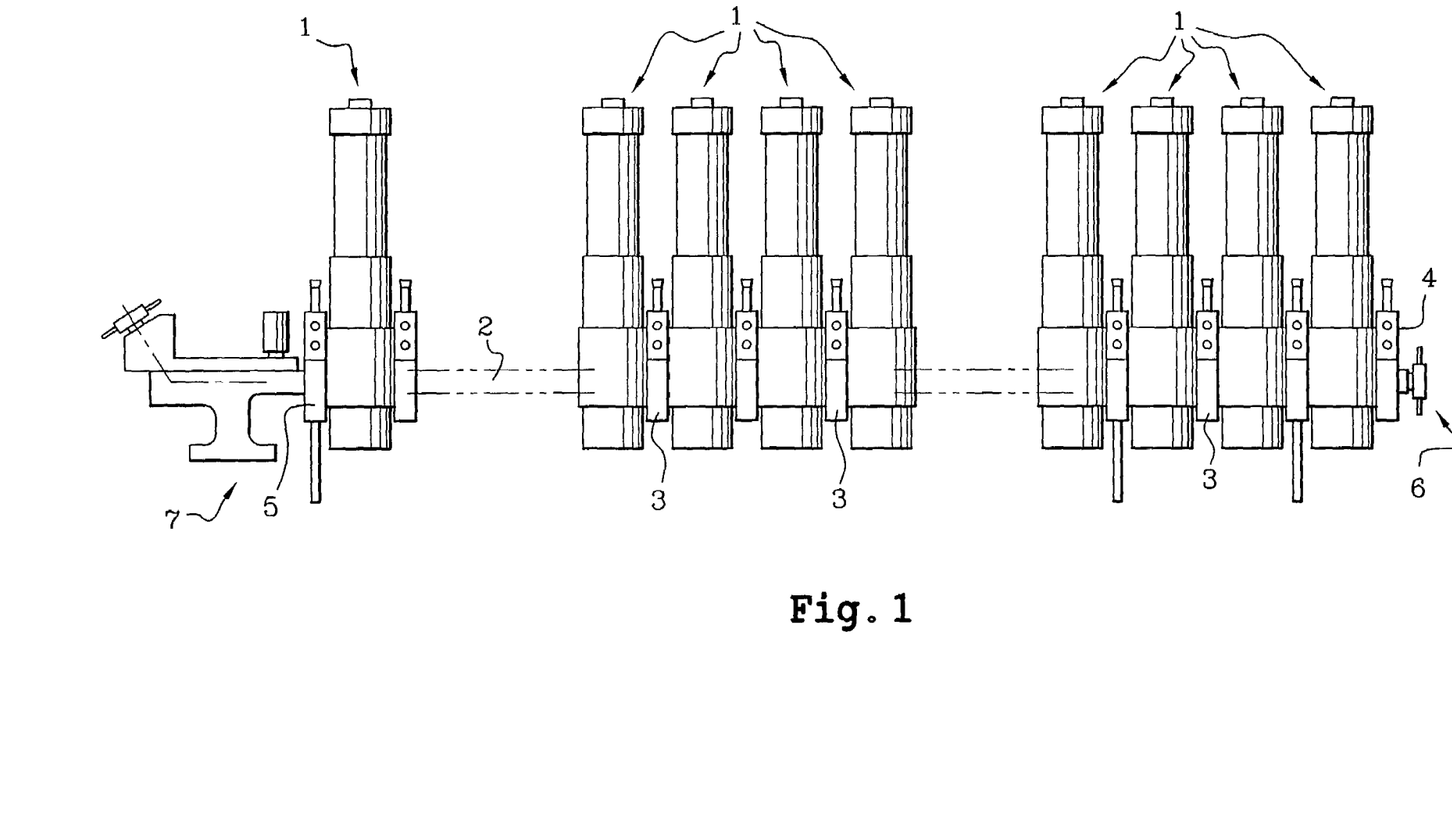
FIG. 1 shows the battery of extractors.

In this embodiment according to the invention, as drawn in FIG. 1, the extractor comprises sixteen individual extractors 1, only a few of them represented, and succeeding each other or being battery set on a pair of parallel rails 2. The intermediate parts 3 are inserted between the individual extractors 1, as well as a first end part 4 behind the last extractor 1 and a second end part 5 before the first extractor 1, closely resembling the intermediate parts 3. Finally, a tightening system composed of a stop part 6 and a push part 7 maintain the battery of individual extractors 1 and intermediate parts 3 (and 4 and 5) in a compressed state.

A further embodiment according to the invention consists of setting, at each end of the battery, two parts 5 and two push systems 7 arranged symmetrically and which then also fulfill the stop function.

Figure 2:
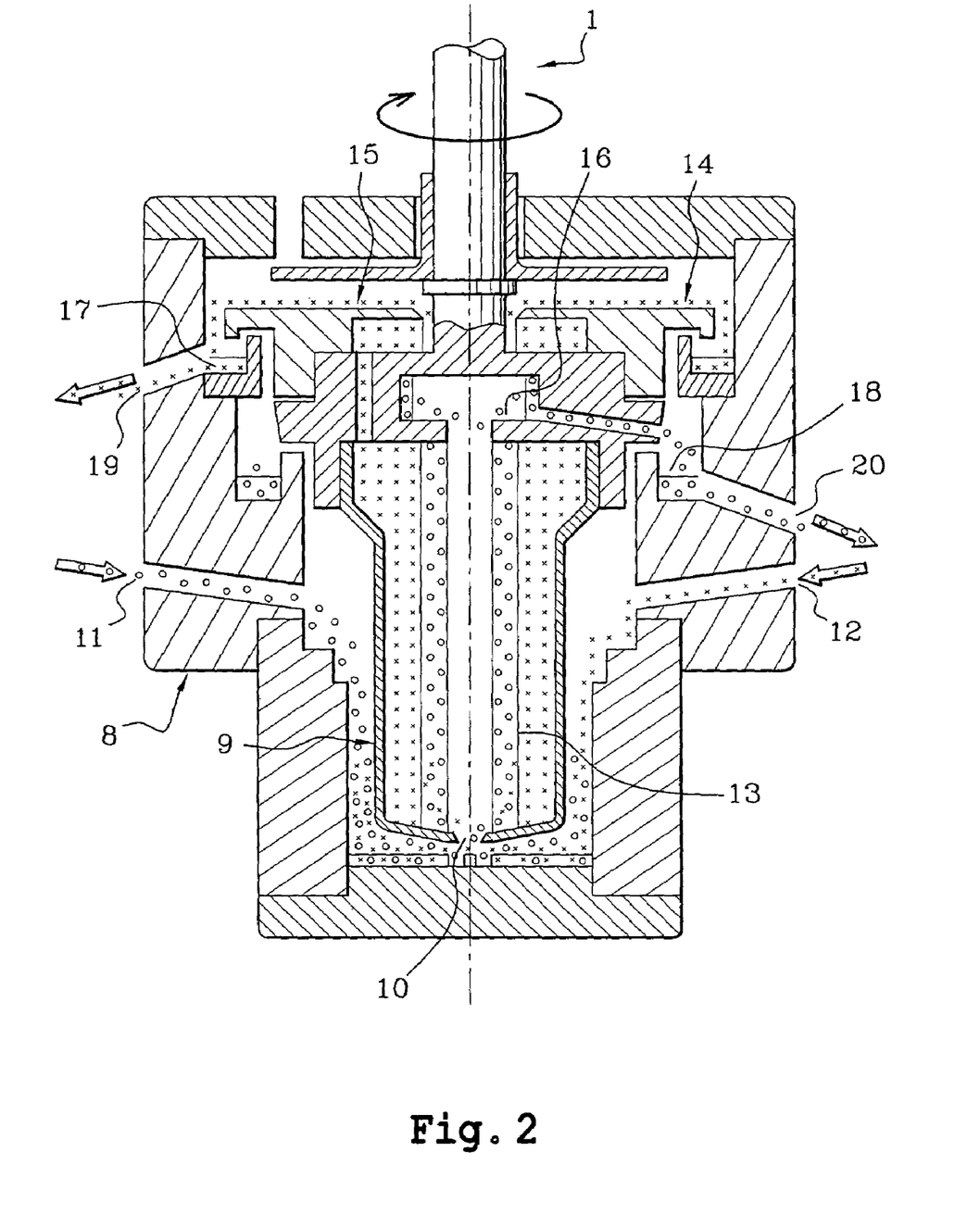
FIG. 2 shows a cross-section of an individual extractor.

The operation of an individual extractor 1 (hereinafter simply called an extractor) will now be described according to FIG. 2. Its active part is housed in a tank 8 and consists of a bowl 9 turning around a vertical axis and with a base drilled by a central hole 10. The light phase crosses the extractor 1 towards the right, and the heavy phase towards the left; their respective inputs, references 11 and 12, allow them to flow to the bottom of the tank 8 where emulsion takes place permitting transfer of the solute or solutes into the bowl 9 by crossing through the hole 10. The high speed rotation of the bowl 9 produces separation and positioning of the phases on either side of the closely cylindrical interface 13, extending up to the top of the bowl 9.

The heavy phase touches a cover 14 provided with a peripheral overflow 15 that provides an outlet for the heavy phase; in the same way a central overflow 16 provides an outlet for the light phase; these overflows 15 and 16 terminate in collection rings 17 and 18 machined at different heights of the tank 8 and communicating respectively with the heavy phase outlet 19 and that of the light phase 20. The extractor 1 is a counter-current flow extractor, wherein a temporary mixture of phases occurs in order to obtain extraction of one or several solutes. It is to be noted that the outlets 19 and 20 overhang the inputs 11 and 12, which enables them to be connected to similar extractor inputs 1 in which the fluids flow under gravity. Therefore, a large number of these extractors can be battery set.

Figure 3:
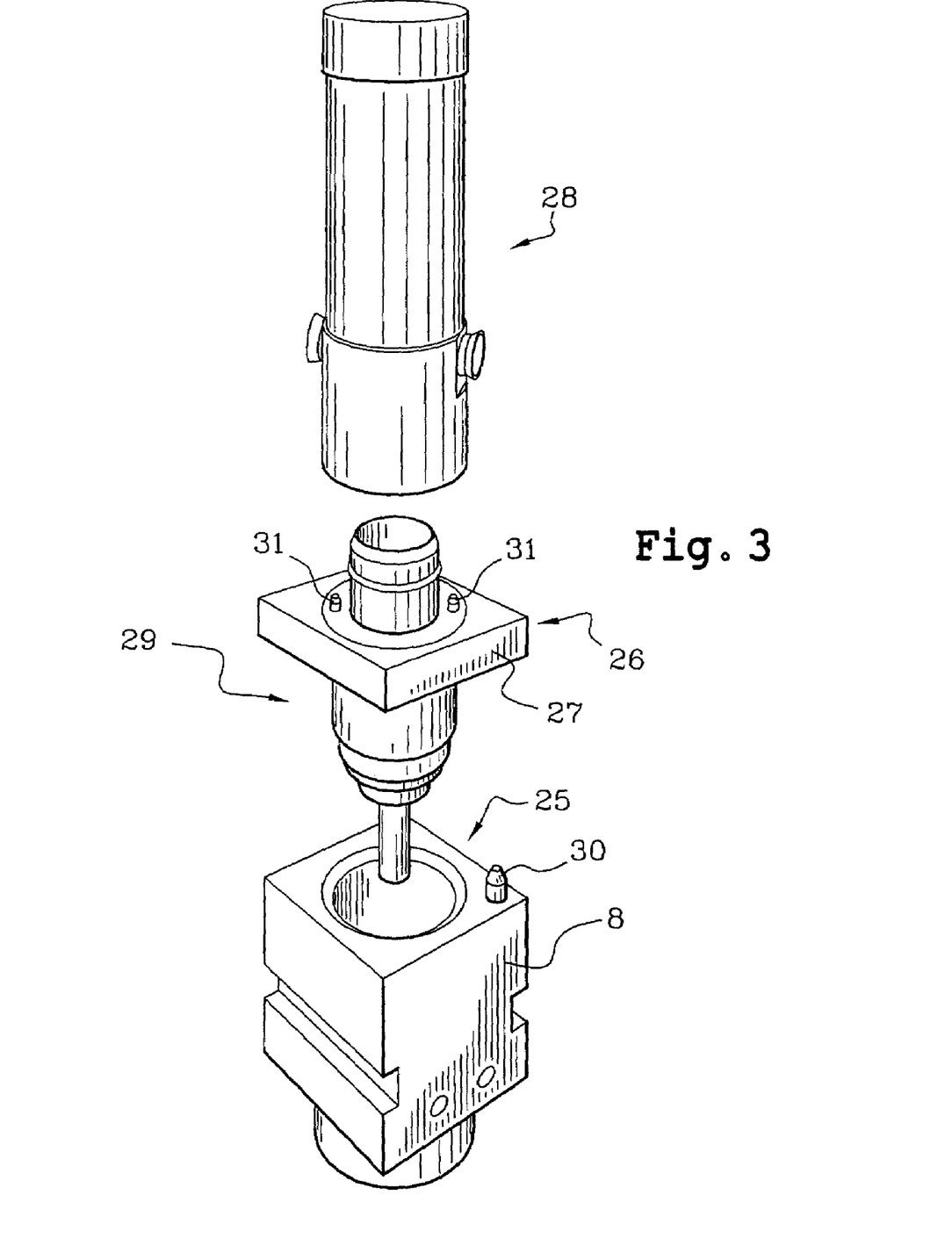
FIG. 3 shows a dismantled individual extractor.

FIG. 3 shows in more detail that the structure of the extractor 1 is designed to be divided into three parts: the first is a base 25 essentially comprising the tank 8, the inputs and outlets; the second 26 comprises the bowl 9 and a cover 27 carrying it, and the upper part 28 includes the motor 29 and its hood. The cover 27 can be set on top of the tank 8, a rotating stop being provided by a centering pin 30; other centring pins 31 being provided between the cover 27 and the hood of the motor 29. Adjustment of the bowl 9 in the tank 8 takes place during operation using bearings, not shown, as known to those skilled in the art, and the adjustment of the motor 29 with the bowl 9 is carried out by shaft coupling. In particular, this involves a specific coupling enabling self-centring. The advantage of these arrangements is that each of the individual extractors 1 can be dismantled by lifting the parts 26 and 28 piled successively on the base part 25, by simple vertical movements and consequently by a remote control manipulator.

Figure 4:
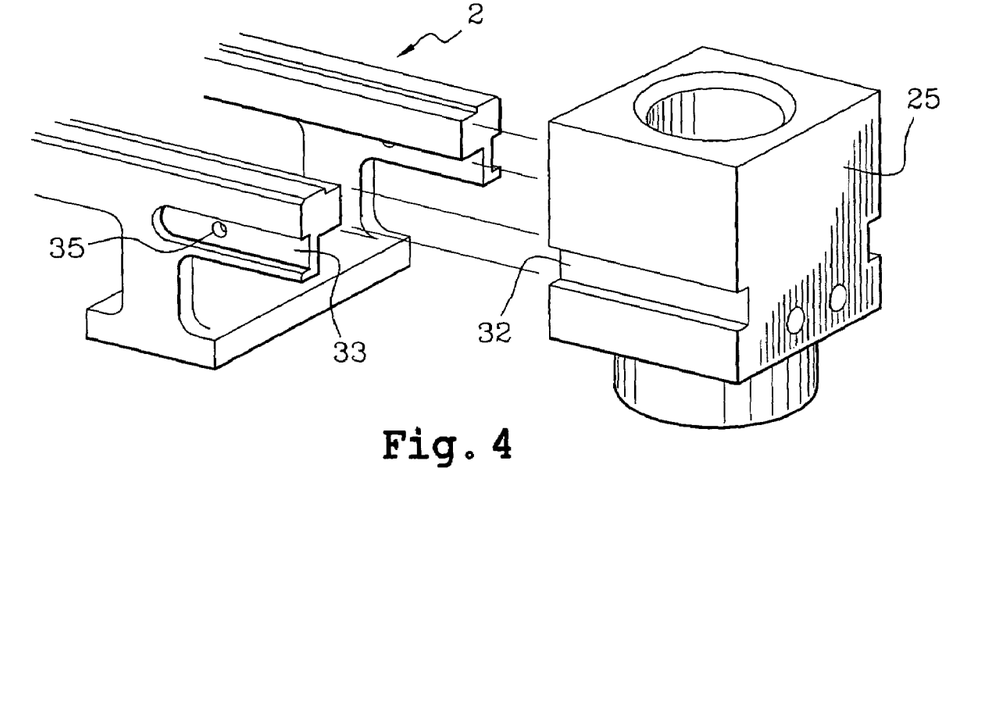
FIG. 4 illustrates the insertion of individual extractors sliding in the rails.
Figure 5:
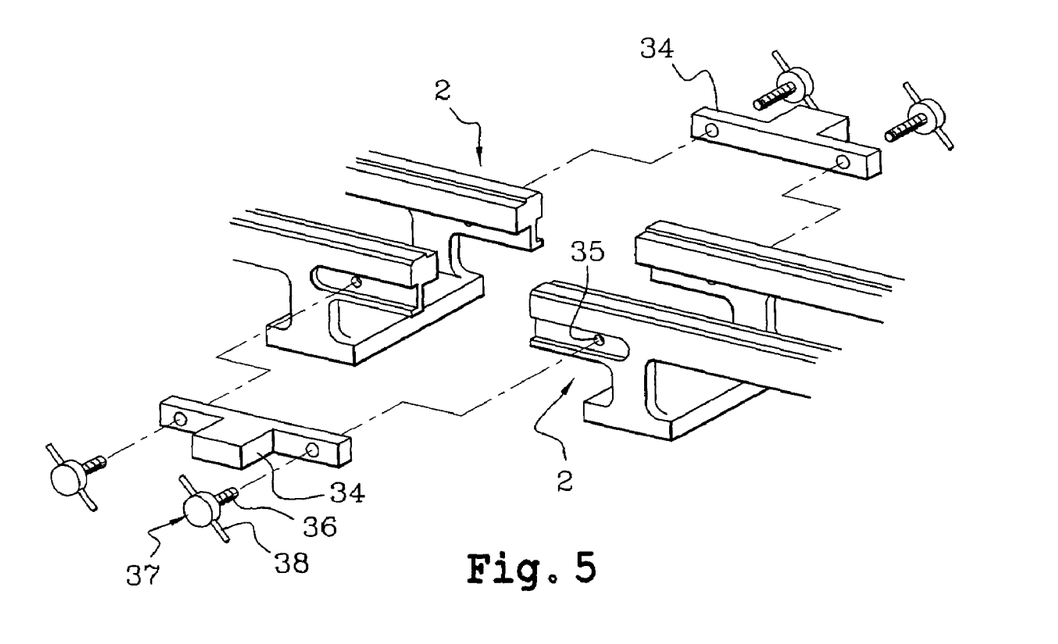
FIG. 5 illustrates the coupling of the rails.

FIG. 4 shows that the bases 25 of the sliding extractors are provided with horizontal grooves 32 allowing them to slide between the rails 2, and supported by the latter. FIG. 4 bis shows that the bases 25 of the extractors in place can, for example, comprise a shoulder 129, and lock pins 130 mounted at regular intervals along the rails 2 lock the extractors by pressing on the shoulders 129. Nonetheless, the lock pins 130 are sufficiently spaced so as to be able to place the extractors together and to lift them to remove them. The spacing of the lock pins 130 can be of the width of an extractor plus the width of an intermediate part. Parts 26 and 28 can then be set on the base parts 25. As already mentioned above, any number of extractors 1 can succeed each other or be set on the rails 2; however it may be preferable to limit the length of the rails 2, but if there is a need later to add a number of extractors 1 requiring a greater length, the rails 2 can be joined together to form a prolongation and assembled according to FIG. 5: they are thus provided with notches 33 at their ends, turned outwards and accepting a connecting key 34 overlapping the notches 33 in the prolongation. The key 34 is drilled and there is a threaded hole in the prolongation 35 of the rail 2, so that the keys can be fixed by placing screws 36 in them, which engage in the threaded holes 35 and hold the keys 34 in the notches 33; the screws 36 have a capstan-shaped head 37, meaning that they have radial spokes 38 that can be manipulated easily by the arms of the remote control manipulator.

Figure 12:
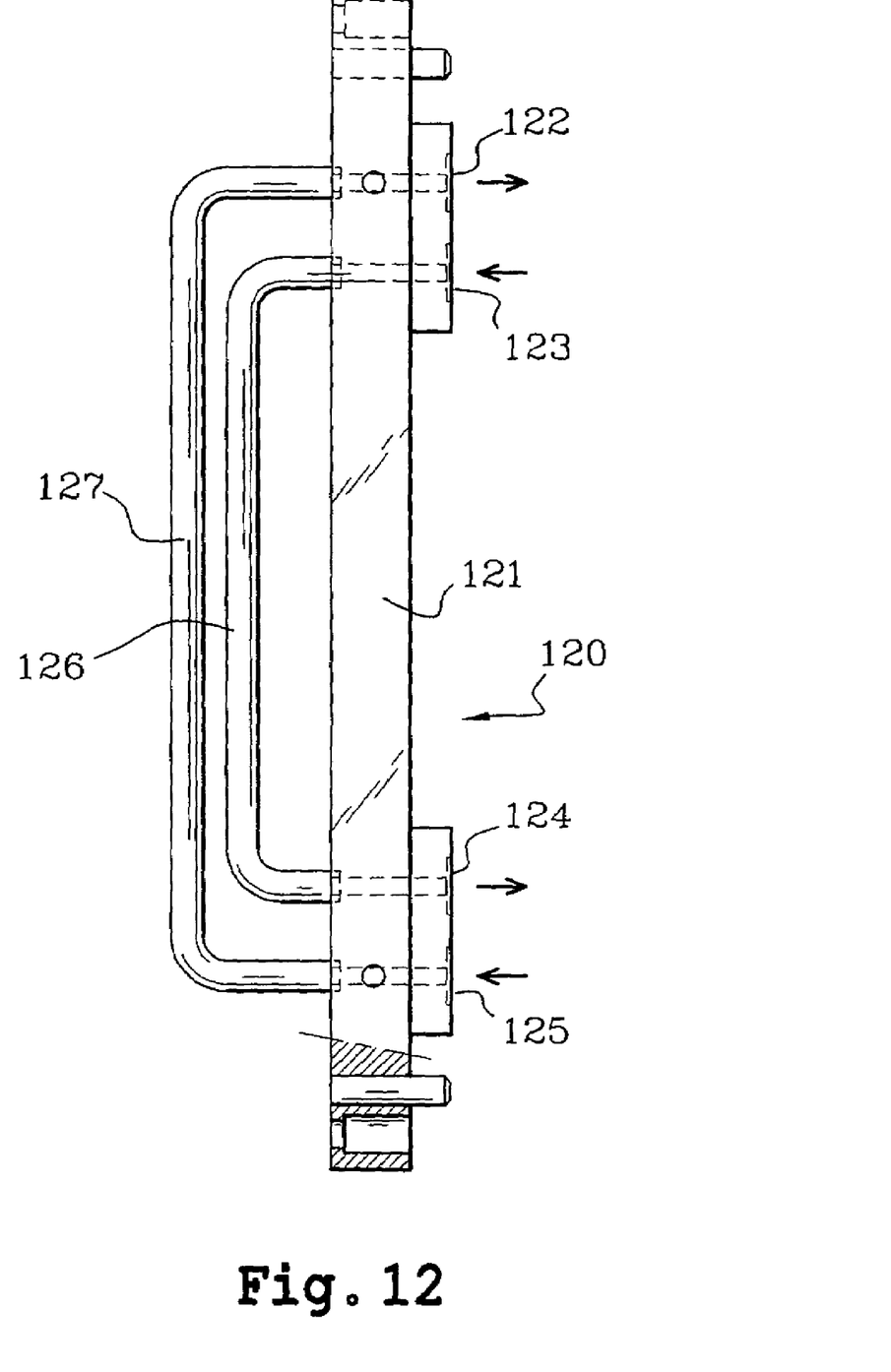

There is also a so-called double end part ensuring counter-current circulation of the phases in the successive extractors or the extractors set on pairs of rails arranged in parallel. This has reference 120 in FIG. 12, where it is shown from below: it is shaped in a block 121 wider than the other parts, and has four drill holes 122, 123, 124 and 125 set in pairs at the lateral ends of the block 121; two pipes 126 and 127 connect the drill holes of different pairs two by two. Thus, one of the liquid phases can pass from one battery of extractors to a parallel battery by the drill hole 123 and 124 and the pipe 126, and the other phase of said battery parallel to the battery mentioned first, by the drill holes 125 and. 122 and the pipe 127. This end part 120 means that the user of the extractor as a whole may not need to connect prolongation rails.

In general, the individual extractors and the intermediate parts are in contact through plane and vertical faces.

The tightening system will now be described, in which it is to be noted that it is designed for remote control manipulation.

Figure 6:
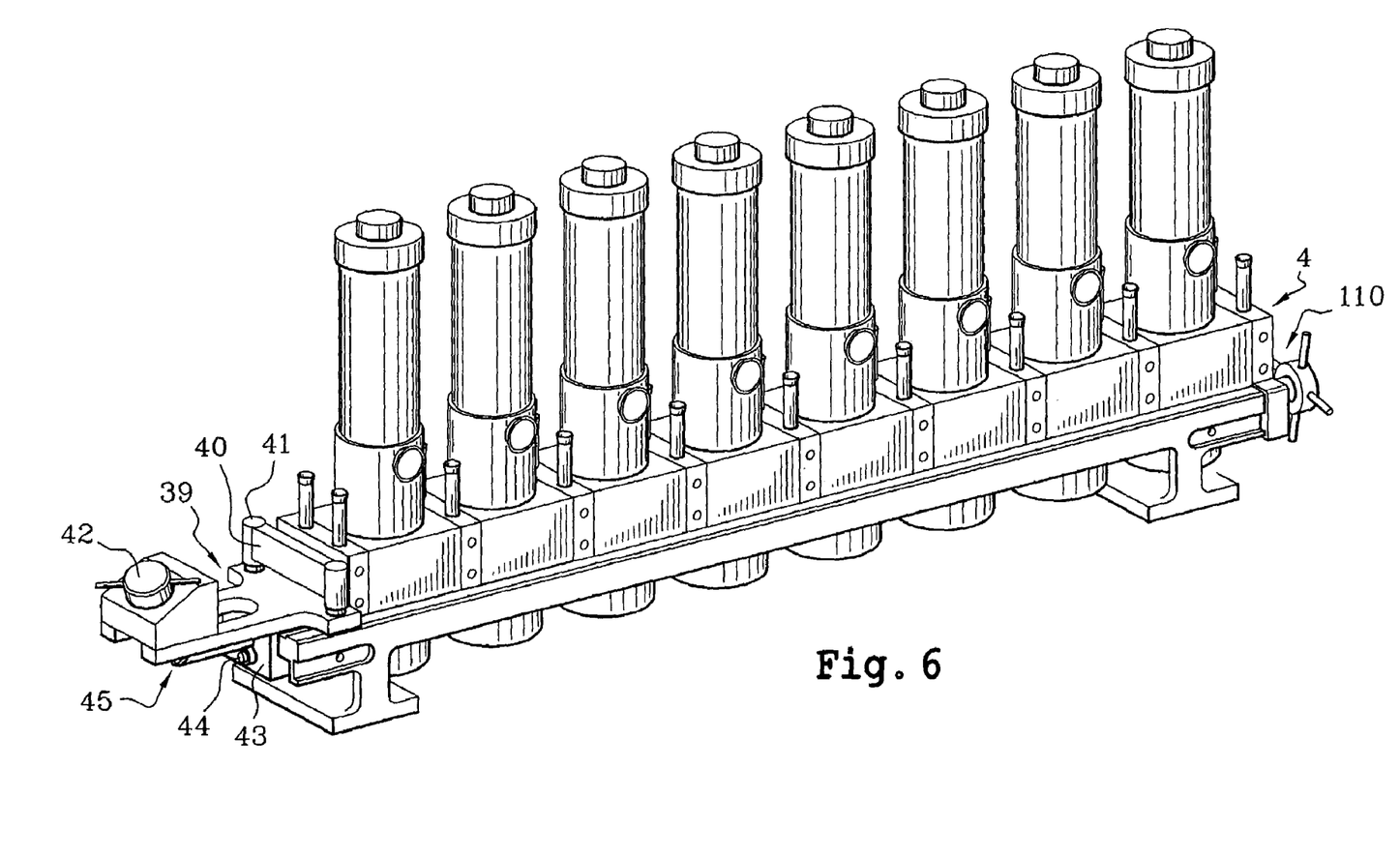
FIG. 6 shows the tightening system.

The pushing part 7 of the tightening system is shown in FIG. 6 and comprises a support 39, a clamp 40 comprising two vertical columns 41 locking the support 39 and penetrating the recesses in the rails 2, together with a tightening capstan 42 mounted on the support 39, which displaces a means such as a sliding stop 43 by a screw 44 connected to the axis of the tightening capstan 42 by a universal joint 45. The stop 43 acts like the mobile jaw of a vice, pushing the extractors 1 towards the part of the stop 6 that acts as a fixed jaw until they are tight, or towards an equivalent device, the clamp 40 ensuring that the tightening system locks on the rails 2. Several possible types of intermediate parts 3 are described below, not forgetting the end parts 4 and 5.

A type usually used for the intermediate parts allows free circulation from one individual extractor 1 to another and for the two phases. The intermediate part, reference 50 in FIG. 7, consists of a block 51 with thickness limited by the plane faces 52 intended to make contact with the plane faces of the tank 8; the block 51 is crossed by ducts 53 and 54, each of which is connected to a phase outlet of an individual extractor 1 at the input of the same phase of an adjacent individual extractor 1. The ducts 53 and 54 are at the height and inclination needed to establish good junctions. Block 51 has a base 55 in the form of an insert to slide between the rails 2 to hold the part 50 laterally; it is set on the rails 2 at the right height by shoulders 56 directed downwards and by which the insert 55 joins up with the rest of the block 51; only one of the shoulders is shown here, the other being symmetrical.

Figure 7:
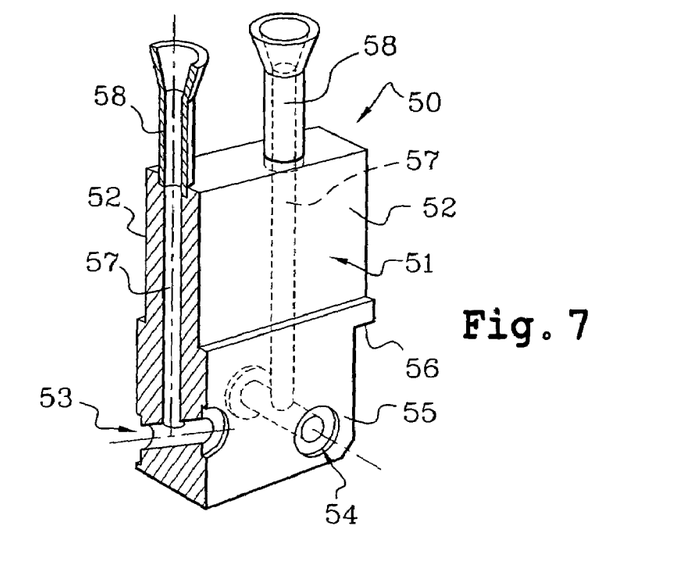

In this particular embodiment according to the invention, as in others, the two ducts 53 and 54 join together to a vertical duct 57 opening out above the block 51 by a tube 58 and intended to balance the pressures between the individual extractors and, depending on the case, either to the supply of a supplementary fluid, or to a withdrawal of part of the flow for taking measurements. A handle or another holding device can be added to simplify manipulation of the part 50. These parts have open throats designed to maintain the joints in place during manipulation.

Figure 8A:
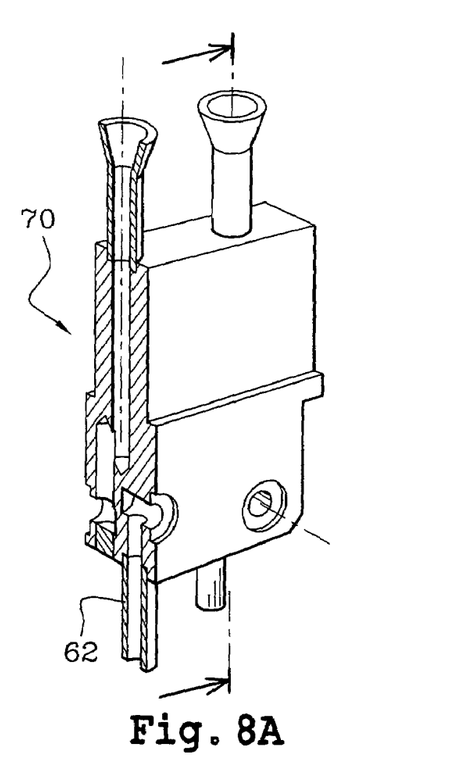
Figure 8B:
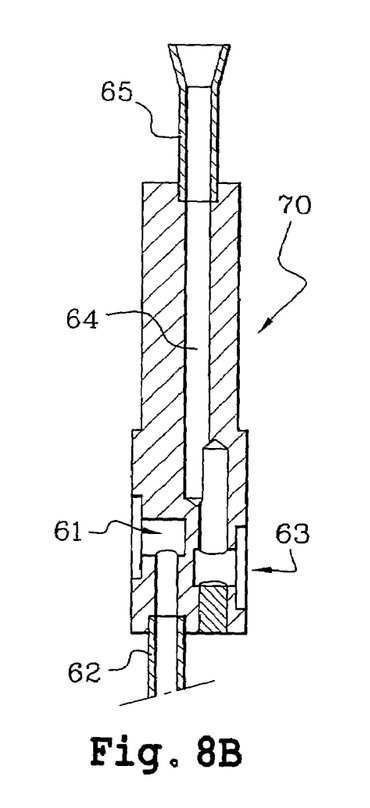

The embodiment of FIGS. 8A and 8B is given the general reference 70 and comprises, instead of the crossing ducts 53 and 54 of the previous embodiment, two devices for phase replacement consisting of an elbow branch line 61 leading towards a downward purge duct 62 and another elbow branch line 63, without any communication with the preceding line, leading to an upward supply duct 64 ending in a tube 65 above the part 70; the product introduced through the supply duct 64 thus serves to replace the phase withdrawn by the descending duct 62 in the battery series. Moreover, this part includes a block exactly the same as block 51. Another embodiment of the invention, in which the same flow path can be applied, with two identical elbow branch lines for the two flows is possible.

Figure 9A:
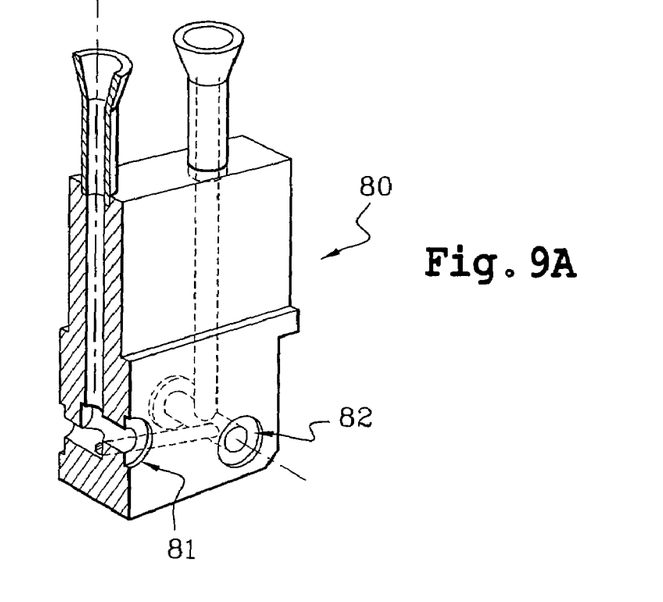
Figure 9B:
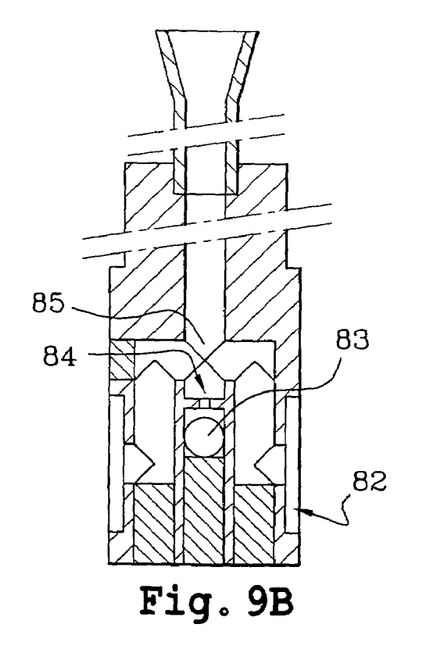

FIGS. 9A and 9B show a further embodiment of the invention, with reference 80, for the intermediate part, in which a recycling flow of one of the phases is constituted in the extractor: here one sees flow ducts closely similar to those of the embodiment of FIG. 7, given the reference numbers 81 and 82 here, and furthermore a transversal connecting duct 83 linking the former with a slope designed to encourage the flow in the required direction; a calibrated diaphragm 84 makes it possible to fix the recycling flow passing through the linkage duct 83. In order to produce the inclination of the connecting duct 83, it may be necessary to make the withdrawal duct 82 so that it forms a higher level 85 inside the part 80.

Figure 10:
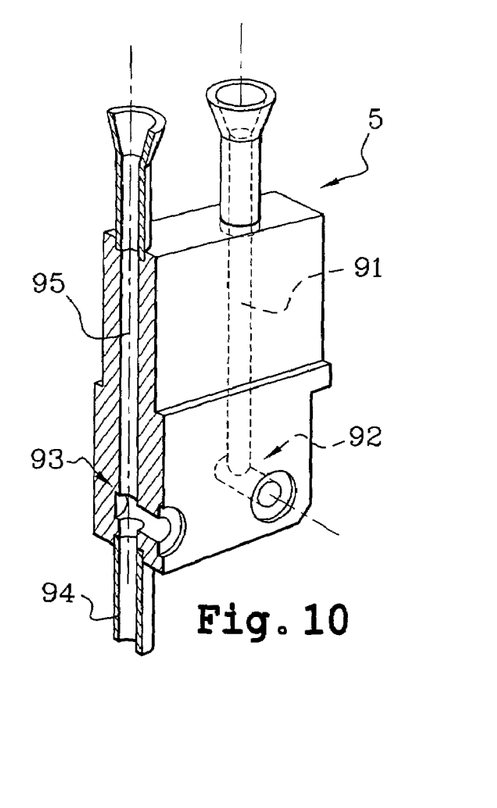

The end part 5, still formed in a block shaped like block 51, is shown in FIG. 10. It comprises an upward supply duct 91 for one of the phases, ending in an elbow branch line 93 finishing in a descending purge duct 94 at the bottom of part 5. Here again, an upward sampling duct, referenced 95 here, can be added to open into the elbow branch line 93.

Figure 11:
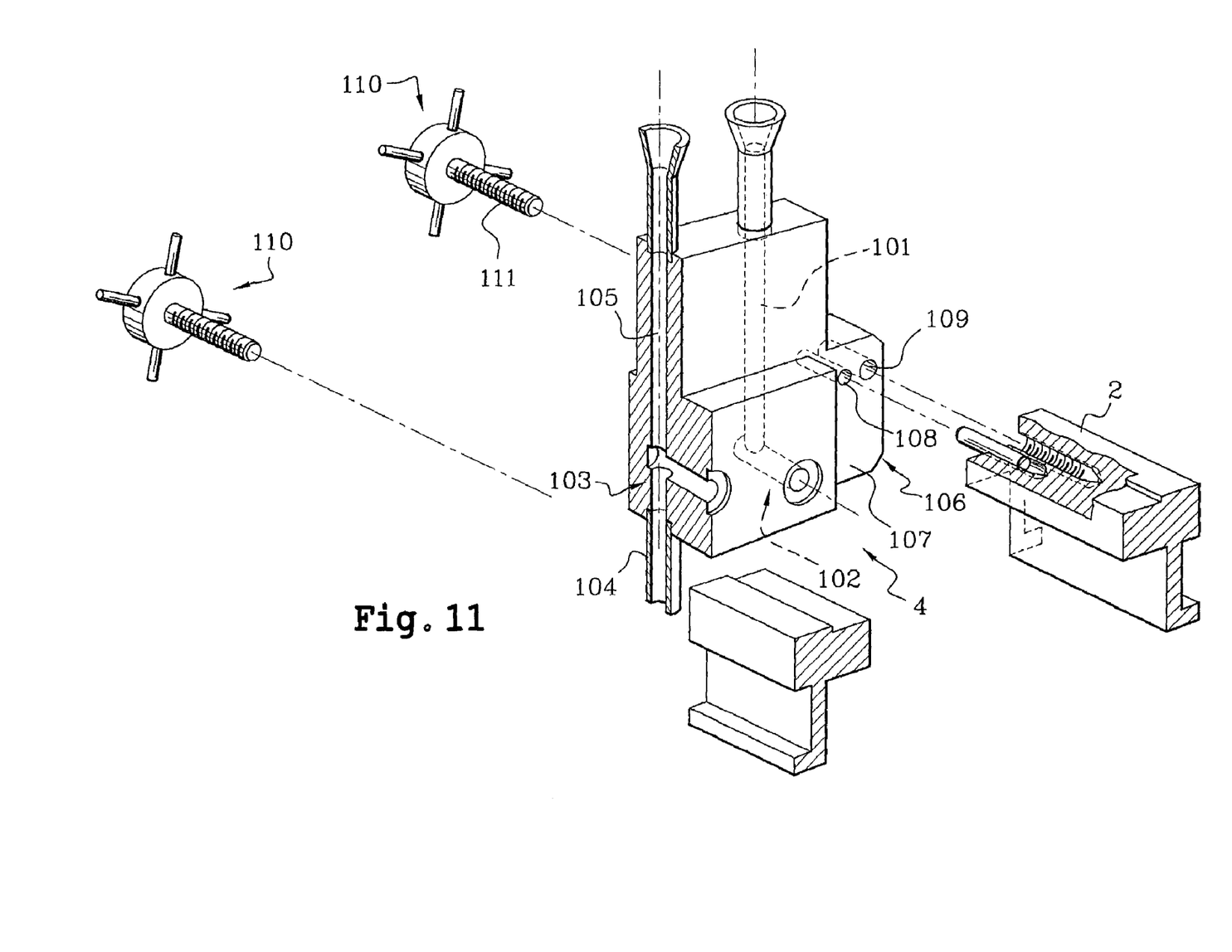

The other type of end part 4, shown in FIG. 11, is slightly similar to the above in that it comprises a supply duct 101 opening upwards, an elbow branch line 102, another elbow branch line 103 for connecting with a descending purge duct 104, and which can be completed by a vent 105, but this end part is not set on the rails 2 but fixed to them: the body 51 of the preceding embodiments is replaced by a body 106 of a slightly different shape and, in particular, comprising a pair of cheeks 107 each of which is provided with a hole 108 for receiving the slugs of the rails 2 and a tightening capstan 110, plus another hole 109 for passing the screw 111 of the tightening capstan 110, which penetrates a threaded hole in the rail 2. Thus, the first end part 4 can be set at the end of the rails 2, and the tightening capstans then placed behind the first end part 4. Next they are screwed in and block the first end part 4, and the whole battery of extractors 1.

The end parts 4 and 5 described here make it possible to introduce each of the flow phases at one end of the battery and to recuperate it at the other end.

It is to be noted that changing one of the intermediate parts 3 only involves a loss of several flow drops.

The invention claimed is:

1. A liquid—liquid extractor for a mixture of two liquid phases, comprising a battery of individual extractors which are aligned to each other, rails extending along the battery and supporting all the individual extractors, the individual extractors each comprising a base which is sliding along the rails and internal ducts for the mixture, intermediate parts inserted between the individual extractors and connecting the individual extractors together, the intermediate parts each comprising a base sliding on the rails, lying on the rails and removable from the rails with a movement transverse to the rails and internal ducts communicating with the internal ducts of the individual extractors, and a system (6, 7) for tightening the battery of individual extractors and the intermediate parts on the rails.

2. Extractor according to claim 1, wherein the individual extractors are centrifugal extractors with countercurrent circulation of phases.

3. Extractor according to claim 1, comprising an end part at least one end of the battery and comprising internal ducts linking the internal ducts of an adjacent one of the individual extractors either to an inlet or to an outlet of either the mixture or one of the phases.

4. Extractor according to claim 1, wherein the tightening system comprises a stop (6) at one end of the rails (2) and a push assembly (7) at an opposite end of the rails, the push assembly comprising a means for fixation on the rails, a pusher and means for activating the pusher.

5. Extractor according to claim 4, wherein the stop means is placed on the end part and consists of a means for tightening an end part of the battery on the rails.

6. Extractor according to claim 4, wherein the fixation means consists of a pair of vertical columns (41) set into the rails.

7. Extractor according to claim 1, wherein the rails are provided with means for connection (34 to 38) to other rails used as prolongation.

8. Extractor according to claim 1, wherein the individual extractors and the intermediate parts are in contact through planar vertical faces.

9. Extractor according to claim 1, wherein the individual extractors are composed of parts (25. 26, 28) stacked successively on the base and provided with centering means.

10. Extractor according to claim 1, wherein the tightening system comprises at least one capstan (42) as actuation means.

11. Extractor according to claim 1, wherein the individual extractors, the intermediate parts and the tightening system are constructed in such a way that they can be remote control manipulated.

* * * * *